United States Patent

Smith

[11] Patent Number: 5,869,085
[45] Date of Patent: Feb. 9, 1999

[54] IRREGULARITY REMEDY

[76] Inventor: Norma Smith, HC 66 Box 16, Richlands, Va. 24641

[21] Appl. No.: 942,145

[22] Filed: Oct. 1, 1997

[51] Int. Cl.$^6$ .......................... A61K 47/00; A23K 1/175; A23L 1/30; A23C 3/00
[52] U.S. Cl. ............................ 424/439; 426/74; 426/523; 426/599; 426/616; 426/638; 426/658; 426/800
[58] Field of Search ............................. 424/439; 426/74, 426/599, 616, 638, 658, 523, 800

[56] References Cited

U.S. PATENT DOCUMENTS

| | | |
|---|---|---|
| 4,661,362 | 4/1987 | Triani et al. . |
| 4,971,810 | 11/1990 | Hoyda et al. ............................... 426/43 |
| 5,248,515 | 9/1993 | Payton et al. . |
| 5,403,606 | 4/1995 | Kurachi . |
| 5,525,634 | 6/1996 | Sintov et al. . |
| 5,547,671 | 8/1996 | Duthinh . |
| 5,567,424 | 10/1996 | Hastings . |

OTHER PUBLICATIONS

Slavin J.L., "Dietary fiber: classification, chemical analyses, and food sources", Journal of the American Dietetic Association, 87 (9), 1164–71, Sep. 1987.

"Healthy Family Cookbook" by Meredith Corporation, pp.228, 348, 1995.

Bon Appetite, America's Food and Entertaining Magazine, p. 162, Dec. 1995.

Primary Examiner—José G. Dees
Assistant Examiner—Marina Lamm
Attorney, Agent, or Firm—Donavon Lee Favre

[57] ABSTRACT

A healthy, nutritious, tasty, well balanced food, which also functions to provide regularity of bowel movement contains:

a) Citrus fruit including at least one fourth of the rind pectin,
b) ginger,
c) apricot or other stone fruit,
d) pumpkin or other member of the squash family,
e) prune, prune juice or other member of the plum family,
f) bran or other fiber bulking agent,
g) orange juice,
h) bananas,
i) applesauce,
j) ascorbic acid, and
k) water.

3 Claims, No Drawings

5,869,085

IRREGULARITY REMEDY

BACKGROUND OF THE INVENTION

The present invention is directed to a healthy, tasteful food combination which promotes regular, normal, bowel movements.

Foods have historically been used to promote health and healing, much more in the past than in the present. There is however due to the ravages of the modern diet and life style, a renewed interest in food and healing.

The following are examples of inventions made to improve the modern life style.

U.S. Pat. No. 4,661,362 Triani (1987) discloses a process for eliminating the harsh bitter flavor associated with bran cereal by contacting the bran cereal with dried citrus peel.

U.S. Pat. No. 5,248,515 Payton et al. (1993) discloses a fruit juice and vegetable puree. The fruit juice improves the flavor of the vegetable puree.

U.S. Pat. No. 5,403,606 Kurachi (1995) discloses using fruit and vegetable material and bran to make artificial rice.

U.S. Pat. No. 5,525,634 Sintov et al. (1996) discloses using a metal salt of pectin to carry drugs to the colon.

U.S. Pat. No. 5,547,671 Duthing (1996) discloses using citrus peel and ginger in a composition to prevent intoxication.

U.S. Pat. No. 5,567,424 Hastings (1996) discloses a health food containing soy lecithin, ginger, bran, apple fiber and a host of other materials.

METAMUCIL natural psyllium fiber is another modern solution to the problems caused by the modern diet and life style. METAMUCIL is fiber therapy for regularity.

BRIEF SUMMARY OF THE INVENTION

The present invention is directed to a composition which is nutritious, healthy, promotes regular bowel movement and does not produce the large painful stools produced by bulking agents such as psyllium. The present invention has particular utility for old people who have difficult bowel movement, and younger people whose metabolism is adversely effected by menopause.

The specific composition of one embodiment the present invention contains:

1 grapefruit, washed, peeled and diced, 1 orange, washed peeled and diced, and 1 lemon, washed pealed and diced, leaving the pectin containing white layer on all of the citrus, this amounts to about 32 ounces by weight of citrus fruit upon which weight, the ratios of the other ingredients are based, 2 cups of orange juice, 1–15 ounce by volume can of apricots-drained, 10 1 inch pieces of candied ginger.

1 15 ounce by volume can of pumpkin, 2 cups of prune juice, 2 cups of applesauce, 4 bananas, heaping ½cup of miller bran, Two and one half cups of water and one half cup dark vinegar, and two teaspoons of FRUIT FRESH preservative. FRUIT FRESH preservative is ascorbic acid otherwise known as vitamin C.

The ingredients are pureed to make about 125 ounces by volume of product. The product can be frozen (uncooked) or processed under heat and or pressure and sealed in individual servings. Left uncooked the product can be refrigerated for 10 days.

One half cup of tofu is preferably added per meal. For a frozen product the tofu can be added before the product is frozen.

Many of the foods in the above composition are an inconvenience to eat alone, but combined in a drink are easily consumed. The above foods can also be combined in a frozen desert in which case some or all of the foods can be used uncooked which improves the flavor. The unprocessed frozen product can be stored for five months which is the storage life of frozen tofu. The flavor of the frozen product is superior to the flavor of the processed product.

The TEN SUPER FOODS irregularity remedy is made in one embodiment by a two part recipe. The first part consists of six cooked foods, water and vinegar. Each fresh food is washed extremely well. Start with:

1) one grapefruit, washed, peeled and diced, 2) one orange, washed peeled and diced 3) one lemon, washed peeled and diced and 4) ten one inch pieces of candied ginger.

The above four ingredients are cooked for one hour in six cups of water at a slow boil. During the last twenty minutes of the hour, the following two ingredients are added:

5) one fifteen ounce can of drained apricots, 6) one fifteen ounce can of pumpkin.

The cooked mixture is then pureed in a blender. One fourth cup of dark vinegar and optionally two teaspoons of FRUIT FRESH preservative are then added, this makes sixty four ounces. Thirty two ounces are frozen and thirty two ounces are refrigerated. The frozen half is moved to the refrigerator the night after the refrigerated half is consumed.

Each morning blend in one cup of the first part of the recipe with the following:

7) one fourth cup prune juice, 8) one fourth cup applesauce, 9) one banana, 10) one tablespoon Millers bran and 11) one cup of orange juice.

As optional ingredients, one fourth cup of tofu and/or one eight to one fourth teaspoon Epson salt can be added. Tofu is good source of protein, but it must be used as directed on the container. Epson salt is added only if needed for irregularity.

The vinegar adds flavor, amino acids, minerals and vitamins.

The citrus fruits must be washed well to avoid any contamination of *e-coli,* salmonella or other bacterial contamination, and if required by the FDA heat processed before combining with the other ingredients.

It is preferred that the citrus fruits be fresh to maintain color and fresh flavor.

The grapefruit provides vitamin C, potassium, folic acid and folate salts, iron, calcium, and little in calories.

The orange and orange juice provides vitamin C, beta carotene, folic acid and folate salts, thiamine and potassium. The orange juice is added to make the irregularity remedy easy to drink.

The lemon is an excellent source of vitamin C.

The candied ginger adds flavoring, spice and may have some medicinal effect. Ginger has historically been used as a medicinal.

The apricots provide beta carotene, iron and potassium.

The pumpkin is a rich source of beta carotene, vitamin C, potassium and is high in fiber and low in calories.

The prune juice contains isotin, helps to relieve constipation, is a rich source of vitamins A, B, E, potassium and iron and contains 200 calories per cup.

The applesauce is low in calories, high in fiber, low in nutrients and also contains pectin.

The bananas contain potassium, folic acid and folate salts, and vitamins C and B6.

The unprocessed millers bran promotes a feeling of fullness, which can lead to weight loss. One must not use large amounts of millers bran because it absorbs vitamins and minerals. Large amounts also adversely effect the taste of the TEN SUPER FOODS remedy.

Tofu is a vegetarian source, high in protein and iron, vitamin B, calcium, potassium, zinc, and is low in calories. It must be used as directed on the container, it is highly perishable.

FRUIT FRESH preservative is vitamin C otherwise known as ascorbic acid. The addition of FRUIT FRESH preservative helps to preserve the fresh color and taste of the TEN SUPER FOODS remedy.

The Epson salt must also be used as directed on the container. The Epson salt is only to be used when the irregularity remedy, for some reason fails to achieve the desired result.

While the preferred embodiment has been set forth both above and below, the composition can be varied without falling outside the scope of the invention. For example one or more of the citrus fruits can be deleted or replaced. It is necessary however that at least one of the citrus fruits and at least some of the pectin associated with the citrus fruit be present.

As to the remainder of the ingredients, only three are necessary, though all are preferred.

The candied ginger, can be replaced by ginger. It is a flavoring spice and a medicinal ingredient. The presence of ginger is preferred.

The apricots can be replaced by other simple stone fruit, though apricots are preferred.

The pumpkin can be replaced in whole or in part by other members of the squash family or one or more members of the genus Cucurbita, though pumpkin is preferred.

The prune juice can be replaced by whole prunes or one or more members of the plum family, though prunes or prune juice is preferred.

The applesauce is an optional ingredient which is preferably present.

The bananas are an optional ingredient which is preferably present.

The bran can be replaced in whole or in part by psyllium fiber or other bulking agents though bran is preferred.

The tofu, which is an optional ingredient can be replace in whole or in part with soy bean meal though tofu is preferred.

The Epson salt which is an optional ingredient, can be replaced in whole or in part by other laxatives.

In the specification and claims ounces refers to ounces by volume unless otherwise indicated or obvious and cups refers to volume.

In its broader aspect the irregularity remedy of the present invention consists essentially of the following ratio of ingredients:

a) 32 ounces by weight of citrus fruit, b) at least 25% by weight of the citrus fruit pectin on the citrus fruit, c) at least a small but sufficient amount to impart flavor to ten ounces by weight of ginger, d) from one to thirty ounces by volume of apricots, e) from one to thirty ounces by volume of pumpkin, f) from one to three cups of prune juice, and g) from one fourth to one cup of Miller's bran.

The irregularity remedy of the present invention also contains from one eight to one half cup of tofu. If fresh tofu is to be eaten, the tofu is added the day of use. If the composition is to be heat sterilized or frozen, the tofu can be added earlier.

If the irregularity remedy occasionally fails to function as an irregularity remedy from one sixteenth to one fourth teaspoon of Epson salt can be added.

The method for making the irregularity remedy of the present invention comprises formulating the following ratios of ingredients:

a) washing, peeling and dicing 32 ounces by weight of citrus fruit, leaving at least 25% by weight of the citrus fruit pectin on the citrus fruit, b) adding from at least a small but sufficient amount to impart flavor to ten ounces by weight of ginger, c) cooking the above for from fifteen minutes to two hours in from one to ten cups of water at a temperature of from 200° F. to 350° F., d) during the cooking period, adding from one to thirty ounces by volume of apricots and from one to thirty ounces by volume of pumpkin, e) puree the cooked mixture, and f) add from one eight to one half cup of dark vinegar, g) add from one to three cups of prune juice, and h) from one fourth to one cup of Miller's bran.

The method preferably includes the addition of from one eight to one half cup of tofu.

The method, in case of occasional need also includes the addition of from one sixteenth to one fourth teaspoon of Epson salt.

Other ingredients that are preferably added and which made the remedy a tasteful, nutritious food include the addition of from one eight to one half cup of applesauce and from one half to two bananas.

DETAILED DESCRIPTION OF THE INVENTION

The first recipe contains the following ingredients:

The specific composition of one embodiment the present invention contains:

1 grapefruit, washed, peeled and diced, 1 orange, washed peeled and diced, and 1 lemon, washed pealed and diced, leaving the pectin containing white layer on all of the citrus, this amounts to about 32 ounces by weight of citrus fruit upon which weight, the ratios of the other ingredients are based, 2 cups of orange juice, 1–15 ounce by volume can of apricots-drained, 10 1 inch pieces of candied ginger.

1 15 ounce by volume can of pumpkin, 2 cups of prune juice, 2 cups of applesauce, 4 bananas, heaping ½cup of miller bran, Two and one half cups of water and one half cup dark vinegar, and two teaspoons of FRUIT FRESH preservative. FRUIT FRESH preservative is ascorbic acid otherwise known as vitamin C.

The ingredients are pureed to make about 125 ounces by volume of product. The product can be frozen (uncooked) or processed under heat and or pressure and sealed in individual servings. Left uncooked the product can be refrigerated for 10 days.

One half cup of tofu is preferably added per meal. For a frozen product the tofu can be added before the product is frozen.

There are two parts to this second recipe. The first part consists of six cooked foods, water and vinegar. Each fresh fruit is washed extremely well.

1) One grapefruit is washed, peeled and diced,

2) One orange is washed, peeled and diced,

3) One lemon is washed, peeled and diced and

4) Ten one inch pieces of candied ginger are added.

The above composition is cooked for one hour in six cups of water at a slow boil. The last twenty minutes of the hour add:

5) One fifteen ounce can of drained apricots and

6) One fifteen ounce can of pumpkin.

Then puree the cooked mixture in a blender. Add one fourth cup of dark vinegar, this makes sixty four ounces. Freeze thirty two ounces and refrigerate the remaining thirty two ounces. Move the frozen half to the refrigerator the night before you will need to start using the remaining mixture.

Each morning blend in one cup of the above mixture and one cup of orange juice with the following:

7) one fourth cup of prune juice, 8) one fourth cup of applesauce, 9) one small banana and 10) one tablespoon of Millers bran.

As optional ingredients, one fourth cup of tofu and one eight to one fourth teaspoon of Epson salt can also be added each morning. The Epson salt is only added if need for irregularity.

The above formulation is used by an elderly woman who had approximately one bowel movement a week. The use of psyllium fiber had resulted in large and painful stools. The use of the above formulation resulted in daily movements of small stools. The use of the above composition promotes a feeling of fullness promoting a bowel movement.

The above formulation was made with the same ratio of ingredients, except that neither the citrus fruit or the other ingredients were cooked. After all of the ingredients, including the tofu but excluding the Epson salt, were blended together, the mixture was frozen. The flavor of the frozen mixture was superior to the flavor of the cooked mixture.

The cooked version was also canned at a commercial type canning facility to test storage stability.

I claim:

1. An irregularity remedy consisting essentially of:

a) 32 ounces by weight of citrus fruit, b) at least 25% by weight of the citrus fruit pectin on the citrus fruit, c) at least a small but sufficient amount to impart flavor to ten ounces by weight of ginger, d) from one to thirty ounces by volume of apricots, e) from one to thirty ounces by volume of pumpkin, f) from one to three cups of prune juice, and g) from one fourth to one cup of bran.

2. The irregularity remedy of claim 1 wherein from one eight to one half cup of tofu is also present in the remedy.

3. The irregularity remedy of claim 1 wherein from one sixteenth to one fourth teaspoon of Epson salt is also present in the remedy.

* * * * *